G. GRUSSENDORF.
SAFETY VALVE FOR STEAM, COMPRESSED AIR, OR GAS.
APPLICATION FILED FEB. 26, 1907.
937,597.                                    Patented Oct. 19, 1909.
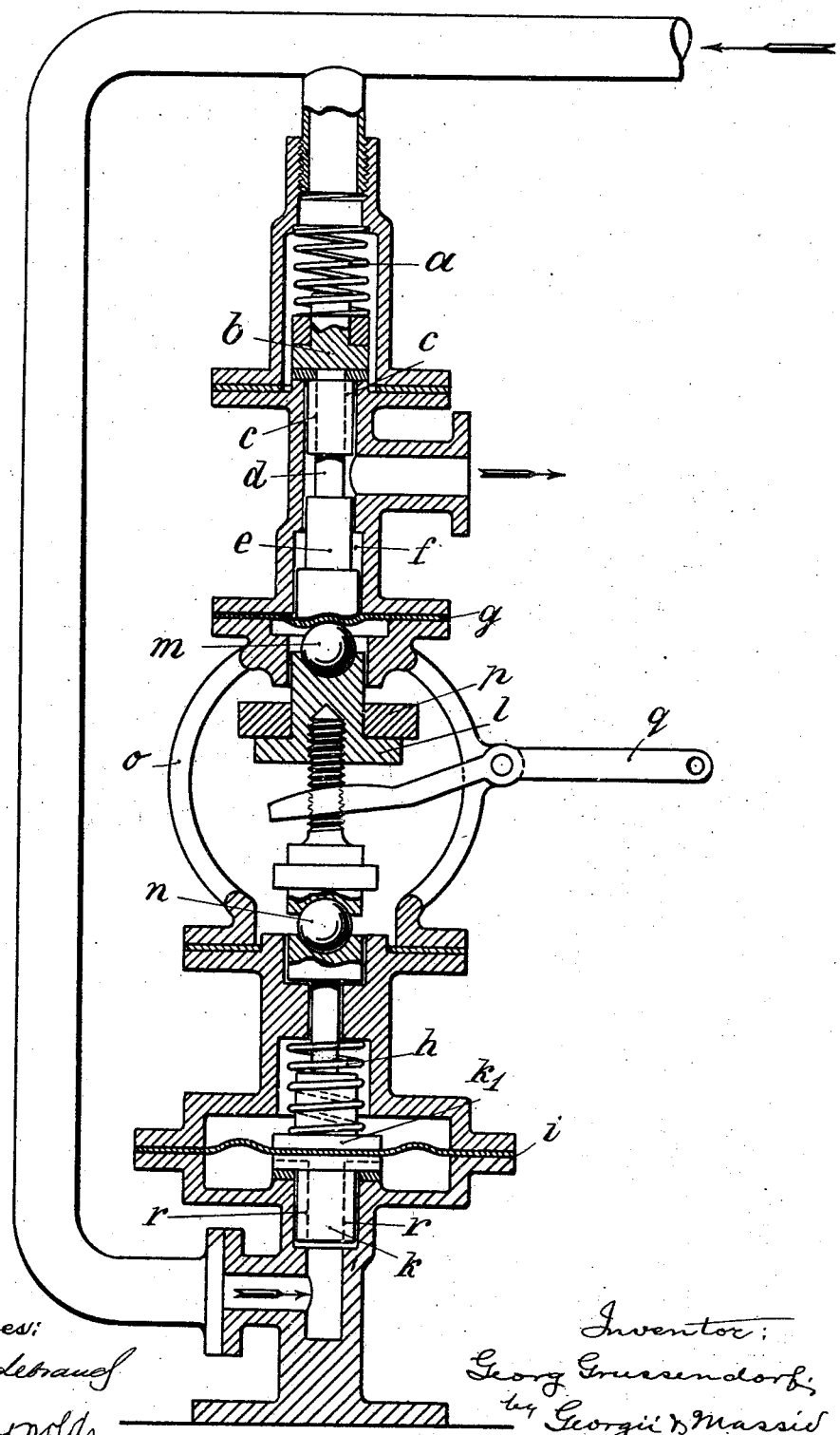

UNITED STATES PATENT OFFICE.

GEORG GRUSSENDORF, OF HANOVER, GERMANY.

SAFETY-VALVE FOR STEAM, COMPRESSED AIR, OR GAS.

937,597.  Specification of Letters Patent.  Patented Oct. 19, 1909.

Application filed February 26, 1907. Serial No. 359,474.

*To all whom it may concern:*

Be it known that I, GEORG GRUSSENDORF, a citizen of Germany, residing at Hanover, Germany, have invented certain new and useful Improvements in Safety-Valves for Steam, Compressed Air, or Gas; and I do hereby declare the following to be a full, clear, and exact description of the invention, such as will enable others skilled in the art to which it appertains to make and use the same.

The present invention resides in a safety valve for pressure fluid such as steam, compressed air or gas, which is opened by means of a flexible force diaphragm standing under the pressure of the steam etc.

The invention is based upon the arrangement, that the valve body is loaded not only by yielding mechanical means such as springs or weights, but also by the steam of the boiler itself, so that the valve is opened as soon as the pressure exercised on the flexible force diaphragms exceeds that of the total load of the valve.

The drawing shows the safety valve in section in one form of construction.

Therein, the blowing-off valve or valve body $b$ is loaded by the spring $a$ or by an equivalent weight and stands under the pressure of the steam of boiler. The seat for the valve is screwed into the upper part of the valve chamber $f$, and the valve stem $e$, provided with the longitudinal grooves $c\ c$ and the annular groove $d$, is loosely guided in the lower valve chamber $f$. The lower part of the valve stem $e$ protrudes somewhat downward from the valve chamber and reaches close to the diaphragm $g$, which consists preferably of an imperforate leather disk cupped in the central portion and covered on both sides with a layer of soft india rubber or impregnated with india rubber or any other water-proof material suiting the purpose. This disk can obviously be reinforced by several similar disks combined. This disk closes hermetically the lower valve chamber $f$ allowing, however, on account of its flexibility, an external pressure exercised upon it to be transferred to the valve stem $e$ in order to open the valve and blow-off the steam in any direction by pipe conduit.

Another characteristic feature of the safety valve, is the imperforate force diaphragm $i$, consisting preferably of a flexible imperforate disk similar in construction to that previously described. This force diaphragm $i$ stands on one side under the pressure of the steam of boiler and on the other side under the pressure of the atmosphere and the spring $h$, and bears on one side upon the support $k$ guided on the wall of the chamber and provided likewise with longitudinal grooves $r\ r$, while on the other side the force diaphragm $i$ carries the stamp or plunger $k_1$, which at its thinner part is guided loosely and which bears the spring $h$. This stamp $k_1$ transfers the stroke or movement of the force diaphragm to the blowing-off valve $b$ by means of an intermediate adjustable link $l$ under the mediation of the two steel balls $m, n$. By the arrangement of the two metal balls $m, n$ easy access is given to all parts in case of dismantling and besides these balls have the effect that the pressure exercised by the force diaphragm $i$ on the intermediate link $l$ is transferred in an axial direction even if the movement of the valve $b$ and the stamp $k_1$ should somewhat deviate from the axial, that is, vertical direction, thus avoiding friction.

In order to protect the force diaphragm $i$ against the corrosive effect of the steam, the lower diaphragm chamber $i'$, which is closed by the force diaphragm $i$, can be filled with glycerin. The weight $p$ is an adjustable weight arranged on the intermediate link $l$, instead of which also a single-arm lever with slide-weight or other equivalent means may be employed.

A double-armed test-lever $q$ is also provided, the inner extremity of which is bifurcated, which lever is pivotally secured to the wall of the intermediate bracket $o$ as a fulcrum. The downward movement of the test-lever $q$ is limited by a support $o'$ formed on the wall of the bracket $o$. This test-lever makes it an impossibility to accidentally overcharge the valve. A gentle pull at the external extremity of the lever $q$ will be sufficient to test and prove the valve. During this operation the principal load (spring $h$) is not lifted, because the intermediate link $l$ is lifted somewhat from the lower ball $n$ as much as necessary.

When the safety valve is adjusted for a certain blowing-off tension, even the highest tensions are not able to compress too much the washer of the valve $b$, as the pressure of the steam, compressed air or gas upon the valve $b$ is counteracted to a certain degree by screwing upward the adjustable link $l$, relieving thus the pressure of the valve *b* somewhat on its seat, so that a good hermetical joint is not prevented but at the same time an easy blowing-off or sensitiveness is obtained.

The course followed by the steam, compressed air or gas is shown by the arrows in the drawing.

According to available space or local circumstances, the force diaphragm may also be placed at the side of the blowing-off valve instead of below the same.

Having thus described my invention what I claim as new is:

1. The combination with a source of fluid pressure, a valve controlling an outlet therefrom and opening counter thereto, yielding mechanical means to load the valve, a diaphragm acted upon by the pressure fluid and having an exposed area greater than that of the valve, a plunger arranged to be operated by the diaphragm, an adjustable link, and balls inserted between the link and the plunger and between the link and the valve stem.

2. The combination with a source of fluid pressure, a pipe leading therefrom, a valve controlling an outlet from the pipe to the atmosphere and opening counter to the fluid pressure and yielding mechanical means to load said valve, of a branch pipe leading from the fluid pressure pipe, a force diaphragm acted upon by the pressure fluid in the branch pipe and having an area exposed thereto greater than the exposed area of the valve, a plunger arranged to be operated by the diaphragm, a sealing diaphragm bearing upon the valve stem, an adjustable link, balls interposed between the adjustable link and the plunger and between the link and the sealing diaphragm, and manually operable means to unseat the valve independent of the force diaphragm.

In testimony whereof I hereunto affix my signature in the presence of two witnesses.

GEORG GRUSSENDORF.

Witnesses:
 ABRAHAM SCHLESINGER,
 LOUIS MUELLER.